No. 624,868. Patented May 9, 1899.
J. ROWE.
PROCESS OF AND APPARATUS FOR MAKING LINED TUBING.
(Application filed July 23, 1898.)
(No Model.) 2 Sheets—Sheet 2.
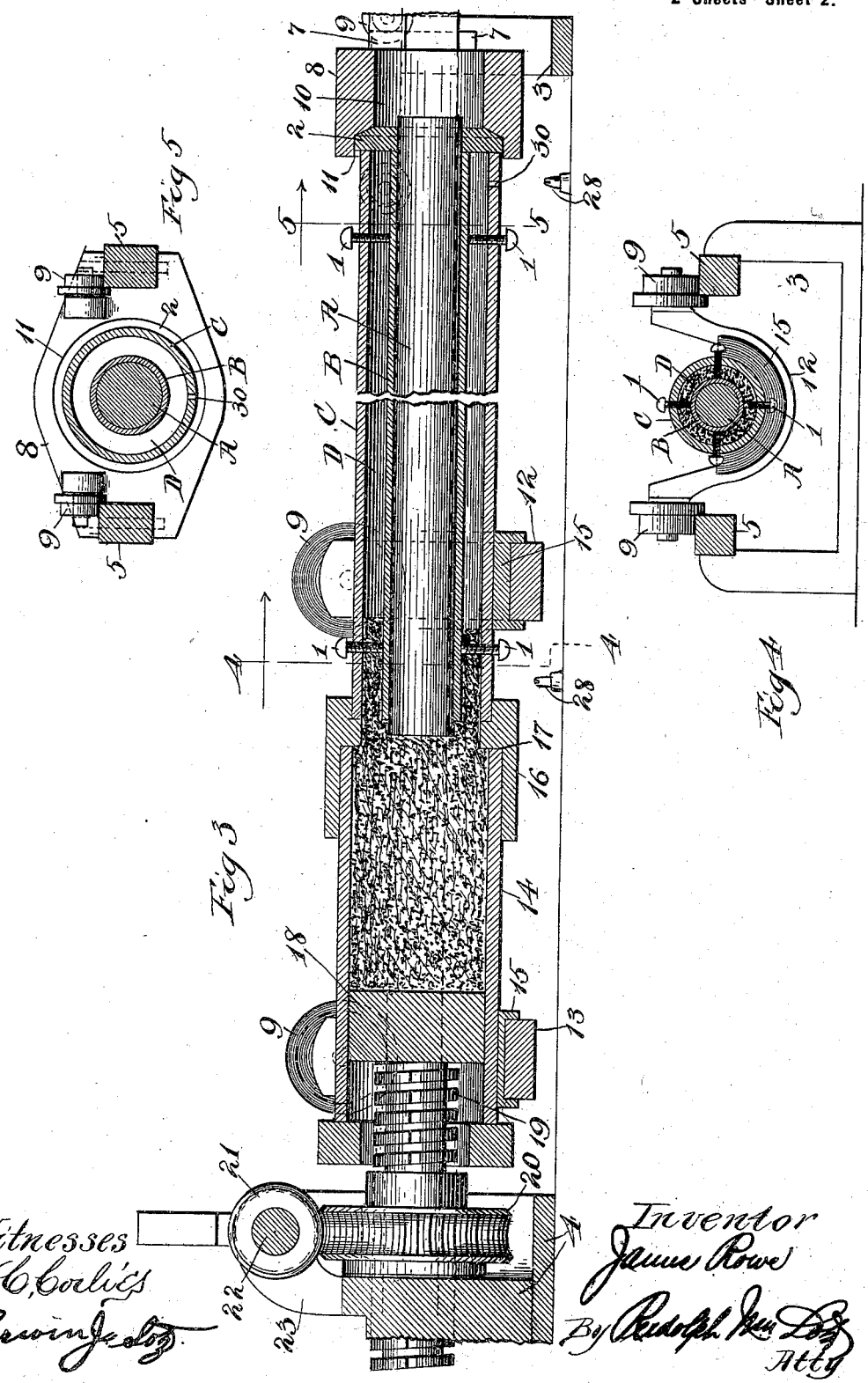

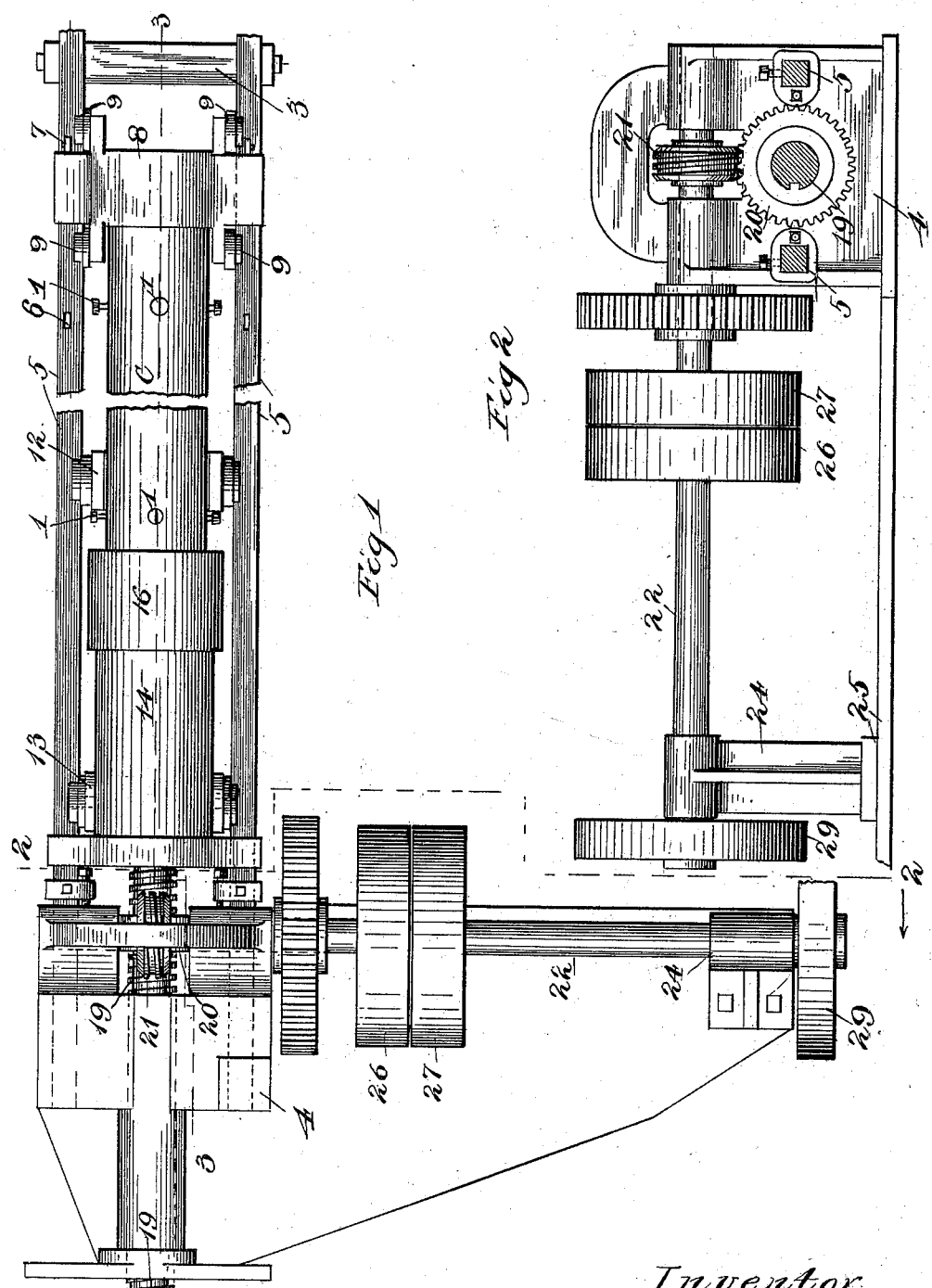

UNITED STATES PATENT OFFICE.

JAMES ROWE, OF CHICAGO, ILLINOIS.

PROCESS OF AND APPARATUS FOR MAKING LINED TUBING.

SPECIFICATION forming part of Letters Patent No. 624,868, dated May 9, 1899.

Application filed July 23, 1898. Serial No. 686,748. (No model.)

*To all whom it may concern:*

Be it known that I, JAMES ROWE, a citizen of the United States, residing at Chicago, in the county of Cook and State of Illinois, have invented certain new and useful Improvements in Processes of and Apparatus for Making Lined Tubing; and I do hereby declare the following to be a full, clear, and exact description of the invention, such as will enable others skilled in the art to which it appertains to make and use the same.

My invention relates to a novel process and machine for making lined tubing, the object being to provide a process by means of which lined tubing of superior quality can be manufactured at small cost and to provide a machine for readily carrying out said process; and it consists in the various steps of the process and in the features of construction and combinations of parts of the machine hereinafter fully described and claimed.

In the accompanying drawings, illustrating my invention, Figure 1 is a top plan view of a machine for carrying out my process. Fig. 2 is a sectional view of same on the line 2 2 of Fig. 1. Fig. 3 is a vertical longitudinal section on the line 3 3 of Fig. 1. Fig. 4 is a sectional view on the line 4 4 of Fig. 3. Fig. 5 is a sectional view on the line 5 5 of Fig. 3.

My present invention consists in a process for making lined tubing, such as forms the subject of my application for patent filed May 18, 1898, Serial No. 681,034, said tubing consisting of two concentric tubes having an annular space between them which is filled with compressed cement. This tubing is designed principally to form molds for casting printers' rollers, and, therefore, the main objects in its manufacture are, first, to make it absolutely true, and, second, of great strength, so that it will remain true. These ends I attain by means of my process without at the same time increasing the cost of manufacture.

My process consists, first, in inserting a mandrel A into the inner tube B, such mandrel being turned on a lathe to form a true cylinder whose diameter coincides as nearly as possible with the inside diameter of the tube. The said mandrel A and tube B are then inserted in the outer tube C and centered therein in any suitable manner, though in the instance illustrated I have shown same centered by means of screws 1, passing through the outer and bearing against the inner tube. The tube C is of greater inner diameter than the outer diameter of the tube B, so as to leave an annular space D between said tubes. The same are then mounted in a suitable frame and one end of the annular space D closed by means of a collar 2, fitting over a projecting end of the mandrel A, and the other end of the annular space D is connected with a suitable device for feeding a filling into the same under high pressure, it being essential and part of my process that the filling be introduced and compressed to such a degree that the tube B will be contracted thereby, so as to fit closely upon the mandrel A, thus insuring a true cylindrical form for said inner tube.

Another feature of my process consists in providing a filling which is introduced in fluid or viscous condition and subsequently hardens and which when hard will withstand high temperatures. I am now using a mixture of litharge and glycerin, which has all the properties I desire.

Another step of my process consists in applying heat adjacent the ends of the outer tube after the filling has been introduced, whereby said filling at said ends is caused to harden more rapidly than the remaining filling, thus enabling me to remove the device for introducing said filling and remove the filling still remaining therein before same hardens. The said tubes are then allowed to rest in said frame until the entire filling has become set, when the mandrel A is forced out, thus leaving a true lined tube, which is subsequently polished interiorly. The screws 1 are also removed or cut down flush with the outer tube C. If removed, the openings left thereby are filled with said filling.

I do not limit myself to the particular filling above described, as any filling having like properties will answer my purpose.

The machine herein shown and which I will now proceed to fully describe is particularly adapted for carrying out my process, though I desire it to be understood that numerous other constructions could be designed which would answer my purposes equally as well.

Mounted at their ends in standards or supports 3 and 4 are two parallel horizontal beams 5, provided at intervals between their ends with openings 6, adapted to receive keys or stops 7. A collar 8, mounted upon rollers 9, running upon said beams 5, is adapted to rest against said keys or stops 7, and thus held against movement in one direction. Said collar 8 is provided with a central opening 10 and an annular groove or recess 11, surrounding same, which is adapted to form a seat to receive and hold said collar 2 in place. Carriages 12 and 13, also running on rollers, are mounted upon said beams 5 and are adapted to receive the tubes C and B and mandrel A and also a cylinder 14, which will be hereinafter described, to hold same centered between said beams 5 and with relation to said collar 8. Said carriages 12 and 13 consist of U-shaped frames depending from their rollers, the curves of the lower ends of same having a radius coinciding with the radius of the largest outer tube intended to be mounted in said machine. When tubes of less radius are to be mounted in said machine, flanged semicircular castings 15 are mounted in said U-shaped frames, thus reducing the radius thereof in accordance with the smaller radius of the tube. Said carriage 12 supports the forward end of the tube C, while the carriage 13 supports the farthest end of the cylinder 14, which is connected with said tube C by means of a sleeve 16, fitting partially over said cylinder 14 and partially over said tube C, the ends of said cylinder and tube abutting against an interior annular shoulder 17 in said sleeve 16. A plunger 18 is mounted in said cylinder 14 and is actuated by means of a screw piston-rod 19, mounted in the support or plane 4 and slidingly keyed therein and receiving its reciprocating motion from a worm-wheel 20, mounted thereon, which forms a nut and is driven from a worm 21 on the drive-shaft 22, journaled in the bearings 23 in said frame 4 and at its other end in a bearing 24 on the bed-plate 25 of said frame 4. Said shaft 22 carries fast and loose pulleys 26 and 27, from the first of which it receives its motion.

After the tubes have been mounted in said machine and likewise the cylinder 14 filled and mounted the shaft 22 is set in motion, and through the medium of the above-described gearing the screw piston-rod 19 is turned and slowly moves into said cylinder 14, where it bears against the plunger 18 and forces same toward the delivery end, thereby forcing the filling contained therein into the annular space D between said tubes B and C under enormous pressure. A small opening 30 is bored in said outer tube C adjacent its rear end, through which the air in said annular space D is exhausted and through which the filling subsequently oozes when said annular space has been filled. As soon as said filling begins to ooze out of said opening 30 the machine is stopped and said opening plugged by a screw. The machine is then again set in motion, and by the strain on the belt driving said pulley 26 it can be readily detected when sufficient pressure is applied. Said shaft 22 is then thrown out of gear, and gas-jets 28, adjacent the ends of the tube C, are lighted, thus applying heat to said ends of said tube, whereby the adjacent filling is caused to set or harden very quickly. By means of a pulley 29 on said shaft 22 said piston-rod is then reversed and withdrawn from said cylinder 14 and the latter removed and cleaned. After the filling in the entire annular space D has set the piston-rod is again moved forward until it bears against the mandrel A, and the latter is thereby forced out of the tube B in an obvious manner.

I claim as my invention—

1. The process of making lined tubing which consists in inserting a mandrel within a tube, mounting said tube and mandrel concentrically in an outer tube so as to leave an annular space between said tubes, introducing a filling into said annular space under pressure and allowing same to harden, and subsequently removing the mandrel from said inner tube, said inner tube remaining as the lining of said tubing.

2. The process of making lined tubing which consists in mounting two tubes concentrically, one within the other so as to leave an annular space between the same, introducing a filling into said annular space under pressure, and causing same to harden by the application of heat while under pressure.

3. The process of making lined tubing which consists in inserting a mandrel within a tube, mounting said tube and mandrel concentrically in an outer tube so as to leave an annular space between said tubes, introducing a filling into said annular space under pressure sufficient to contract said inner tube upon said mandrel, permitting said filling to harden, and subsequently removing said mandrel, said inner tube remaining as the lining of said tubing.

4. The process of making lined tubing which consists in inserting a mandrel within a tube, mounting said tube and mandrel concentrically in an outer tube so as to leave an annular space between said tubes, introducing a filling in plastic condition into said annular space under pressure sufficient to contract said inner tube upon said mandrel to true said tube, causing said filling to harden, and subsequently removing said mandrel, substantially as described, said inner tube remaining as the lining of said tubing.

5. A machine for manufacturing lined tubing, comprising a frame comprising two parallel horizontal beams mounted in supports at their ends, devices for supporting tubes between said beams, at one end and a cylinder at the other end, a collar for establishing communication between said tubes and said cylinder, a plunger in said cylinder, and means for operating said plunger to force the contents of said cylinder into said tubing, comprising a screw-rod mounted in one of said supports and gearing carried by said support for operating said rod, substantially as described.

In testimony whereof I affix my signature in presence of two witnesses.

JAMES ROWE.

Witnesses:
RUDOLPH WM. LOTZ,
ERWIN J. LOTZ.